United States Patent [19]

Sibeud

[11] 4,262,784
[45] Apr. 21, 1981

[54] DEVICE WITH A JACK FOR CONTROLLING A GEAR BOX SYNCHROMESH, AND METHOD FOR USING SAME

[76] Inventor: Jean-Paul Sibeud, Chaponnay, France

[21] Appl. No.: 479,537

[22] Filed: Jun. 14, 1974

[30] Foreign Application Priority Data

Jun. 18, 1973 [FR] France .................................. 73 23025

[51] Int. Cl.³ ..................... F15B 13/044; F16D 25/14
[52] U.S. Cl. ........................................ 192/52; 91/429; 91/459; 192/85 R; 192/85 C
[58] Field of Search .......................... 91/35, 459, 429; 251/129; 137/625-666; 192/53 R, 85 C, 85 R, 109 F, 52, 85 A; 74/335, 364

[56] References Cited

U.S. PATENT DOCUMENTS

| 2,731,952 | 1/1956 | Szabo | 91/459 X |
|---|---|---|---|
| 2,734,609 | 2/1956 | Fritzsch | 192/85 C |
| 3,424,951 | 1/1969 | Barker | 137/1 X |
| 3,469,590 | 9/1969 | Barker | 137/1 |
| 3,470,892 | 10/1969 | Barker | 137/1 |
| 3,516,331 | 6/1970 | Oelrich et al. | 91/459 X |
| 3,530,668 | 9/1970 | Siebers et al. | 74/866 X |
| 3,596,742 | 8/1971 | Zierak | 192/85 A |
| 3,659,631 | 5/1972 | Rakoske | 251/129 X |
| 3,674,121 | 7/1972 | Copeland | 192/52 |
| 3,739,813 | 6/1973 | Worden | 91/459 X |
| 3,823,621 | 7/1974 | Kubo et al. | 192/52 X |

*Primary Examiner*—Irwin C. Cohen
*Attorney, Agent, or Firm*—Irving M. Weiner; Pamela S. Burt; John L. Shortley

[57] ABSTRACT

A method and device for controlling the fork of a synchromesh for a gear box. A command signal sent by the operator is converted into signals by a modulator whose output controls an electric valve to open and close several times in succession. The electric valve controls a jack which in turn controls the fork connected to a sliding gear associated with the synchromesh, whereby the instantaneous pressure of the fluid supplied to the jack is varied during the steps of approach, synchronization, and locking of the synchromesh.

6 Claims, 4 Drawing Figures

DEVICE WITH A JACK FOR CONTROLLING A GEAR BOX SYNCHROMESH, AND METHOD FOR USING SAME

The present invention relates to the control of a synchromesh device for a vehicle gear box by means of a jack supplied with a pressurized fluid.

BACKGROUND OF THE INVENTION

In such a type of drive, it is difficult to regulate the action of the jack so as to enable the various synchronization steps to take place correctly.

Various systems have been proposed for controlling the force applied to the drive by the jack.

A first solution consists in using a jet in the supply to the jack. This results in slowing down the operation too much, so that this solution is not advantageous. Furthermore, the jet is apt to become clogged.

If the jack is a double action jack, the back pressure generated by the braking action of the fluid escaping from the unutilized chamber causes the working time of the synchromesh device to be reduced, while the total gear change time remains unchanged.

A second solution consists in mounting a pressure reducer in the supply to the jack. This inproves the working conditions for the synchromesh device, but makes the system sensitive to variations in the viscosity of the lubricating oil, owing to the reduction of the force applied to the control, and, for the same reason, prevents the clutch from working safely and totally.

Owing to the poor results achieved, the above expedients have not been very successful. The main cuases for such poor operation are as follows:

(1) the assembly consisting of the jack, the slider, the fork, and the dog-clutch is the seat of substantial solid frictions. Such frictions become much reduced when the motion is being started;

(2) any slowing down in the rise of pressure in the jack brings about a delay between the advent of the command of execution and the meshing of the synchromesh device. This time is included in the total time for the gear change concerned, but is completely useless since it does not correspond to any effective synchronization action. This shows that using a supply jet influences the system adversely;

(3) supplying the jack under full pressure allows overcoming the solid frictions readily. But said frictions decrease when a displacement takes place, so that the beginning of the synchronization occurs with a substantial stress, and thus with a very substantial synchronization torque at a high differential speed. This results in a very high required instantaneous power which should be avoided (unduly high surface temperature on the synchromesh cones, which leads to a premature destruction of the latter).

An object of the present invention is to obviate the above-mentioned drawbacks by getting the various synchronization steps under control.

SUMMARY OF THE INVENTION

The present invention provides a method for controlling the fork of a gear box synchromesh, comprising the steps of operating the fork by means of a jack supplied with a fluid, the instantaneous pressure of which is varied during the steps of approach, synchronization proper, and locking of the synchromesh. The pressure of the fluid supplied to the jack is modulated by means of a three-way valve interposed between the jack and a source of constant pressure fluid.

A method according to the invention aims at carrying out the approach step very rapidly, while providing a small force at the beginning of the synchronization step, said force increasing later on. To this end, the device according to the invention includes;

a pneumatic jack, the movable rod of which is connected to the fork controlling the synchromesh device;

a three-way electrovalve, which connects the jack either to a source of compressed air, or to a discharge cirucit;

an electric modulator, which receives the command of execution and sends a modulated signal to the winding of the electrovalve, which signal causes the electrovalve to open and close several times in succession.

The method according to the invention consists therefore in supplying the jack with compressed fluid, the instantaneous pressure of which is modulated so as to vary according to a law which shows at least two maxima and one minimum distributed over the approach, engagement and locking steps.

DETAILED DESCRIPTION

Figure 1:
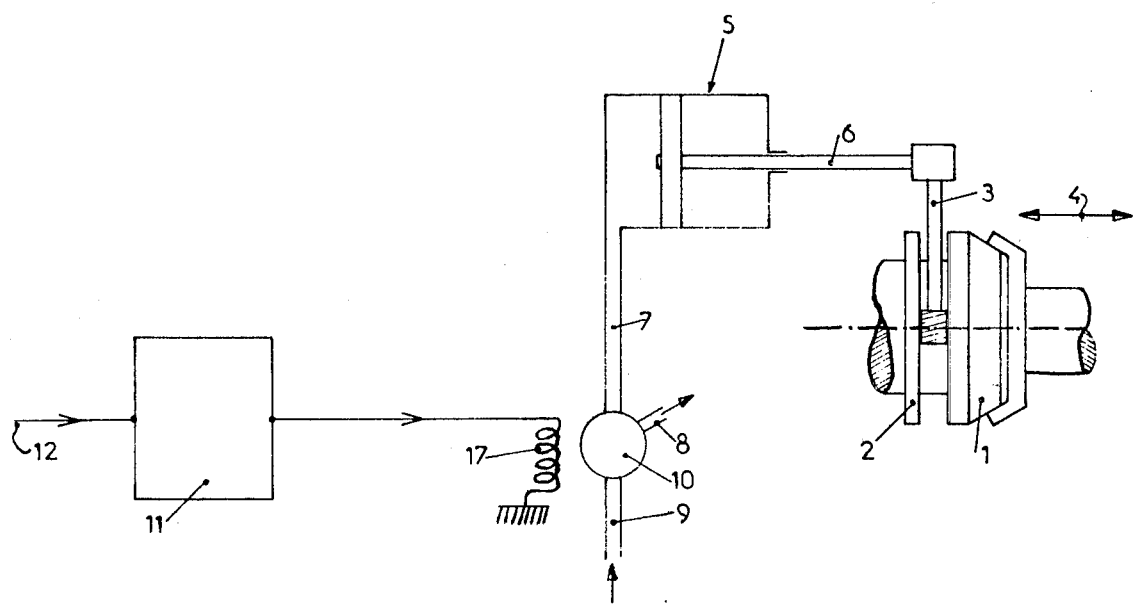
FIG. 1 is a diagrammatic view showing the whole of a device according to a first embodiment of the invention.

The device illustrated in FIG. 1 includes:

a synchronization ring 1 mounted on a sliding gear 2;

a fork 3 which controls the sliding of the gear 2 according to the direction indicated by the double arrow 4;

a pneumatic jack 5, the movable rod 6 of which actuates the fork 3;

a return line 8, which ensures the discharge of the circuit if the jack 5 is a pneumatic jack;

a three-way electrovalve 10, adapted to connect the line 7 of the jack 5 either to the supply line 9, or to the return line 8;

an electric modulator 11, which receives the command of execution given at 12 by an operator, and sends modulated signals into the electric winding 17 controlling the electrovalve 10.

The operation is as follows:

The necessity of approaching the synchronization rapidly, while starting it, however, with small force, involves a law of air pressure in the jack 5 which has at least a maximum 13, a minimum 14, and a further maximum 15. In the graph on FIG. 2, the variation in pressure in the jack 5 is plotted as a function of time. The total time for the operation is T, ranging from $t_0$ to $t_3$. From $t_0$ to $t_1$ the approach step (unlocking a gear and meshing the synchromesh 1 of another gear) takes place.

From $t_2$ to $t_3$ the locking step takes place.

These two periods of time should be reduced as much as possible.

The period of time from $t_1$ to $t_2$ is a useful period, as it is the synchronization period proper.

Figure 2:
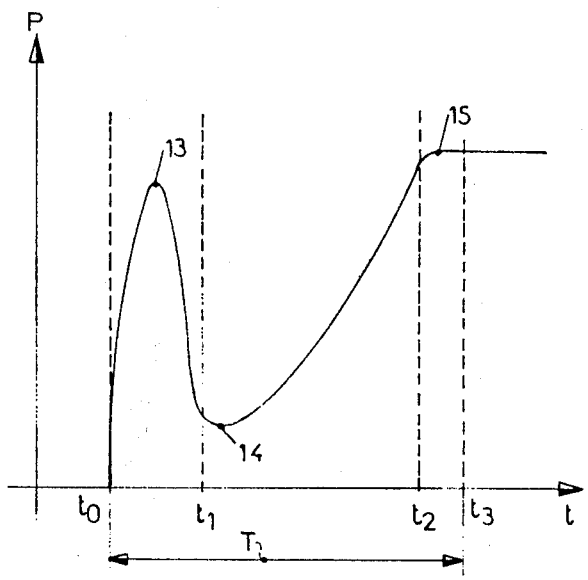
FIG. 2 illustrates the law of pressure variation in the jack during a synchronization and locking operation.

The graph in FIG. 2 shows the variation in the pressure of supply during the steps of the operation.

The time T (total time) is predetermined.

The power P depends on the dimensions of the synchromesh.

It is possible to write:

$$P = (AWC/t_2 - t_1)$$

wherein:

AWC = variation in kinetic energy, which depends on the inertia and the difference in speed of the parts to be synchronized.

The closer $t_2 - t_1/T$ is to 1, the better the control.

The above-mentioned known expedients do not allow exceeding 0.5 for said ratio $t_2 - t_1/T$.

According to the invention, when the control electric circuit 11 is energized at 12 by a command of execution (signal 16 in FIG. 3), said circuit 11 emits a modulated signal such as 18, 19 and 20 for the control of the electrovalve 10. Said signal 18, 19 and 20 is characterized by a series of alternating opening and closing times.

Figure 3:
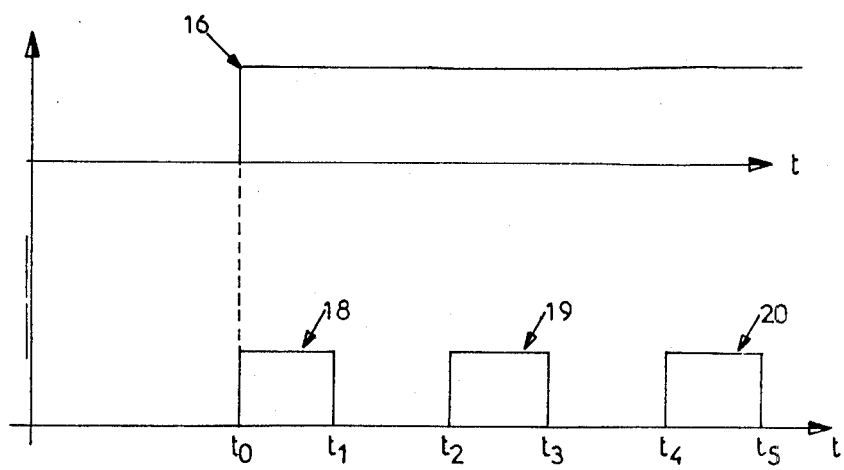
FIG. 3 is a curve illustrating the variation in the voltages, as generated by the command of execution and the signals controlling the electrovalve, respectively.

The opening times in FIG. 3 are $(t_1 - t_0)$, $t_3 - t_2)$, and so on, $(t_{2n+1} - t_{2n})$.

The closing times are $(t_2 - t_1)$, $(t_4 - t_3)$, and so on, $(t_{2n} - t_{2n-1})$.

The control law for the synchromesh 1 as a function of time, taking the characteristics of the valve 10 of the jack 5 of the device is obtained by adjusting the times $t_1$, $t_2$, $t_3$, . . . .

The electric modulator 11 may be constructed from conventional circuits such as, for example, a number of associated monostable multivibrators which are started when the above-mentioned command of executional control signal 16 occurs, or in accordance with the device disclosed in U.S. Pat. No. 3,516,331 the disclosure of which is incorporated herein by reference thereto. As indicated hereinabove, the command signal 16 sent by the operator is converted into signals by the electric control circuit or modulator 11 whose output controls the threeway electrovalve 10 to open and close several times in succession. If desired, the electrical control circuit or modulator 11 can be made in accordance with the control circuits disclosed in U.S. Pat. No. 3,424,951 the disclosure of which is incorporated herein by reference thereto.

Figure 4:
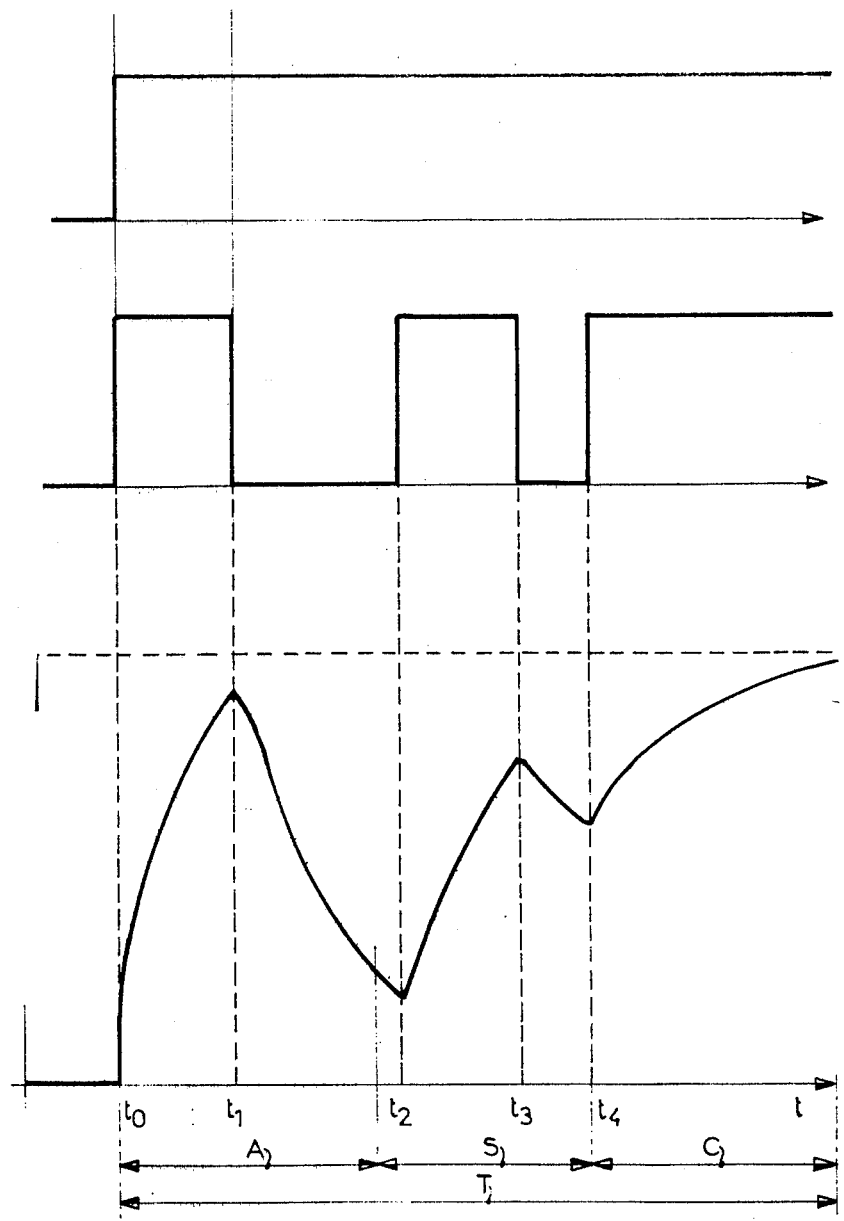
FIG. 4 is a diagram showing simultaneously the variations in the various parameters of control in a modification of the invention.

FIG. 4 illustrates:

at the top, the command of execution 16 (engaging a gear ratio);

below, the driving order sent to 17 for the electrovalve 10;

at the bottom, the variation in pressure in the jack 5.

It is attempted to reduce the time $(t_1 - t_0)$ allowing to approach the synchromesh 1 rapidly, while limiting, at the beginning of the operation, the driving force in a manner such that the synchromesh 1 works at an instantaneous power which is substantially constant.

At the end of the operation the pressure can be much higher than that which is allowable in a conventional control, whereby the locking is made much safer.

In the modified embodiment illustrated in FIG. 4, the pressure curve shows:

a first maximum 13 at the time $t_1$, during the approach step A;

a first minimum 14 at the time $t_2$, shortly after the beginning of the synchronization step S;

a second maximum 21 during the synchronization step S;

a second minimum 22 at the end of the synchronization step S and the beginning of the locking step C;

a third maximum 23, at the level of which the pressure remains then stabilized.

It will be noted that:

the first pressure maximum 13 is higher than the second maximum 21;

the third maximum 23 is higher than the two maxima 13 and 21;

the useful interval $(t_2 - t_1)$ (FIG. 2) or S (FIG. 4) is greater than 55% of the total time T taken by the whole operation of control of the fork 3.

I claim:

1. A method for controlling a gear box synchromesh, comprising the steps of:

operating a fork, which controls a gear box synchromesh, by means of a pneumatic jack supplied with compressed air, the instantaneous pressure of which is varied during the steps of approach, synchronization proper, and locking of the synchromesh;

modulating the air pressure by means of a three-way valve interposed between the jack and a source of constant pressure compressed air; and supplying the jack with compressed air according to a pressure law which includes three successive maxima and two successive minima, to wit, a first maximum during the approach step, a first minimum shortly after the beginning of the synchronization step, a second maximum during the synchronization step proper, a second minimum at the end of the synchronization step and the beginning of the locking step, and a third maximum at the end of the locking step.

2. A method according to claim 1, characterized in that the first maximum of pressure during the approach step is higher than the second maximum which occurs during the synchronization step.

3. A method according to claim 1, characterized in that the third maximum of pressure is higher than the first and second ones.

4. A method according to claim 1, characterized in that, after the end of the locking step, the internal pressure in the jack is kept on a level with the third maximum to ensure the locking of the synchromesh in its operating position.

5. A method according to claim 1 characterized in that supplying the jack with the compressed air causes time interval S corresponding to the synchronization step proper to be greater than 55% of the total time T taken for the entire operation of control of the fork.

6. A device for controlling the synchromesh of a gear box, wherein said device includes:

a pneumatic jack, the movable part of which is connected to a fork which controls the synchromesh;

a source of compressed air;

a discharge circuit;

a three-way electrovalve for connecting the jack either to the source of compressed air, or to the discharge circuit;

a winding connected to the electrovalve;

a means of sending a signal of execution from an operator; and an electric modulator, which receives the command of execution from the operator and sends a modulated signal to the winding of the electrovalve, which signal causes said electrovalve to open and close several times in succession.

* * * * *